United States Patent [19]

Chesarek

[11] 4,125,873

[45] Nov. 14, 1978

[54] DISPLAY COMPRESSED IMAGE REFRESH SYSTEM

[75] Inventor: Donald J. Chesarek, Los Gatos, Calif.

[73] Assignee: International Business Machines Corporation, Armonk, N.Y.

[21] Appl. No.: 811,213

[22] Filed: Jun. 29, 1977

[51] Int. Cl.[2] .................. G06F 3/14

[52] U.S. Cl. .................. 364/900; 340/324 AD

[58] Field of Search ... 364/200 MS File, 900 MS File; 340/324 A, 324 AD; 365/222

[56] References Cited

U.S. PATENT DOCUMENTS

| | | | |
|---|---|---|---|
| 3,568,178 | 3/1971 | Day | 340/324 AD |
| 3,665,410 | 5/1972 | Holland | 364/200 |
| 4,020,462 | 4/1977 | Morrin | 340/324 A X |

*Primary Examiner*—Gareth D. Shaw

*Assistant Examiner*—Thomas M. Heckler

*Attorney, Agent, or Firm*—James A. Pershon

[57] ABSTRACT

Scanned image data is compressed and stored in a central processing unit. An image for display is recalled, decompressed, and then recompressed for refresh storage for a CRT display device. The refresh compressed image is recalled when necessary for display and refresh, and directed through a plurality of parallel operated decompressors and refresh buffers to drive the display unit. An unfilled compressed refresh image store is filled with zeros to complete the display with an all white scan. In an overflow situation, a partition boundary is generated to identify that more data follows. To display the subsequent image, upon request, the overflow increment value which repeats a few scan lines is transmitted and a visual overlap image with subsequent data is compressed for refresh store and display and refreshed as required.

19 Claims, 7 Drawing Figures

REFRESH CONTROLLER

| IMAGE POSITION 1 | | IMAGE POSITION 2 | | IMAGE POSITION 3 | | RASTER BUFFER | |
|---|---|---|---|---|---|---|---|
| ADDRESS | CONTENT | ADDRESS | CONTENT | ADDRESS | CONTENT | UNIT # , | SUB ADDR. |
| 1 | L(1) | 1 | 0 | 1 | 0 | 1 | 1 |
| 2 | L(2) | 2 | 0 | 2 | 0 | 1 | 2 |
| 3 | L(3) | 3 | 0 | 3 | 0 | 1 | 3 |
| 4 | L(4) | 4 | 0 | 4 | 0 | 1 | 4 |
| 5 | L(5) | 5 | 0 | 5 | 0 | 2 | 1 |
| 6 | L(6) | 6 | 0 | 6 | 0 | 2 | 2 |
| 7 | L(7) | 7 | 0 | 7 | 0 | 2 | 3 |
| 8 | L(8) | 8 | 0 | 8 | 0 | 2 | 4 |
| 9 | L(9) | 9 | 0 | 9 | 0 | 1 | 1 |
| 10 | L(10) | 10 | 0 | 10 | 0 | 1 | 2 |
| 11 | L(11) | 11 | 0 | 11 | 0 | 1 | 3 |
| 12 | L(12) | 12 | 0 | 12 | 0 | 1 | 4 |
| ⋮ | ⋮ | ⋮ | ⋮ | ⋮ | ⋮ | ⋮ | ⋮ |
| ⋮ | ⋮ | 375 | 0 | ⋮ | ⋮ | 2 | 3 |
| ⋮ | ⋮ | 376 | 255 | ⋮ | ⋮ | 2 | 4 |
| ⋮ | ⋮ | 377 | L(377) | ⋮ | ⋮ | 1 | 1 |
| ⋮ | ⋮ | 378 | L(378) | ⋮ | ⋮ | 1 | 2 |
| ⋮ | ⋮ | ⋮ | ⋮ | ⋮ | ⋮ | ⋮ | ⋮ |
| 385 | L(385) | ⋮ | ⋮ | ⋮ | ⋮ | 1 | 1 |
| 386 | 255 | ⋮ | ⋮ | ⋮ | ⋮ | 1 | 2 |
| 387 | 0 | ⋮ | ⋮ | ⋮ | ⋮ | 1 | 3 |
| 388 | 0 | ⋮ | ⋮ | ⋮ | ⋮ | 1 | 4 |
| ⋮ | ⋮ | ⋮ | ⋮ | ⋮ | ⋮ | ⋮ | ⋮ |
| ⋮ | ⋮ | ⋮ | ⋮ | 882 | 0 | 1 | 2 |
| ⋮ | ⋮ | ⋮ | ⋮ | 883 | 255 | 1 | 3 |
| ⋮ | ⋮ | ⋮ | ⋮ | 884 | L(884) | 1 | 4 |
| ⋮ | ⋮ | ⋮ | ⋮ | 885 | L(885) | 1 | 5 |
| ⋮ | ⋮ | ⋮ | ⋮ | ⋮ | ⋮ | ⋮ | ⋮ |
| ⋮ | ⋮ | 892 | L(892) | ⋮ | ⋮ | 1 | 4 |
| ⋮ | ⋮ | 893 | 255 | ⋮ | ⋮ | 2 | 1 |
| ⋮ | ⋮ | 894 | 0 | ⋮ | ⋮ | 2 | 2 |
| ⋮ | ⋮ | 895 | 0 | ⋮ | ⋮ | 2 | 3 |
| ⋮ | ⋮ | ⋮ | ⋮ | ⋮ | ⋮ | ⋮ | ⋮ |
| 1000 | 0 | 1000 | 0 | 1000 | L(1000) | 2 | 4 |

FIG. 3

FIG. 4 REFRESH REGULATOR

| SEGMENT | I D S ADDRESS | I D S DATA | DATA TO I R S ADDRESS GENERATOR | |
|---|---|---|---|---|
| | | | MEMORY ADDRESS | COMPRESSED LENGTH |
| 1 | 0 | 0 | 16,384 | 3 |
| 2 | 1 | 0 | 16,384 | 3 |
| 3 | 2 | 0 | 16,384 | 3 |
| 4 | 3 | 0 | 16,384 | 3 |
| 5 | 4 | 0 | 16,384 | 3 |
| 6 | 5 | 255 | 16,387 | 31 |
| 7 | 6 | 35 | 0 | 35 |
| 8 | 7 | 21 | 35 | 21 |
| 9 | 8 | 86 | 56 | 86 |
| 10 | 9 | 70 | 142 | 70 |
| 11 | 10 | 4 | 212 | 4 |
| 12 | 11 | 255 | 16,387 | 31 |
| 13 | 12 | 0 | 16,384 | 3 |
| 14 | 13 | 0 | 16,384 | 3 |

FIG. 6

DISPLAY COMPRESSED IMAGE REFRESH SYSTEM

BACKGROUND OF THE INVENTION

The invention relates generally to a display image processing system and more particularly to a refresh system that stores compressed information of the image.

FIELD OF THE INVENTION

In a display device such as a cathode ray tube type, it is necessary to continually refresh or retransmit the data to the display since the retention of the displayed image by the display device is insufficient for a complete scanning by a human operator. The refresh device continually retransmits the same image until a new image is required.

The refresh of a display device can be accomplished in either of two ways. First, the refresh information can be obtained from an uncompressed representation of the information to be displayed or the refresh information can be obtained from a compressed representation. Refresh information from the compressed representation can result in a much less expensive display subsystem by reducing the amount of memory storage required to store the refresh information for a single image. The use of a compressed representation reduces the refresh memory store capacity from one half to one twentieth of the capacity of that required in a display that refreshes from the uncompressed representation of the image. A major cost item in a CRT image display is the cost of the refresh buffer. A display system based on storage of a compressed representation may offer a significant cost advantage over a display which refreshes from an uncompressed representation of the image.

In order to implement a raster display designed to present image data which accomplishes refresh from a compressed representation of the image, both of the following problems must be overcome. First, a means must be provided which permits the display operator to examine the contents of an image whose compressed representation will not fit in the display refresh storage. This is known as the partition problem. Second, the instantaneous peak decompressor data rate problem must be solved. A means must be provided to permit the use of multiple decompresors in order to reduce the instantaneous data rate required by a single decompressor.

Existing Alphanumeric (A/N) and vectorgraphic CRT displays generally refresh from a compressed representation of the information to be displayed. Alphanumeric displays do not have the partition or data rate problems because the decompression ratio is constant and always significantly greater than seven to one. Vector graphic display systems limit the amount of information which can be presented through the use of sophisticated system software and thus avoid the partition problem. Because of the serial nature of the compressed representation used in vector graphic displays, beam directed presentation formats are used as opposed to raster presentation formats. Where a raster format is used at the CRT, a scan conversion process must be employed. The compressed refresh image display of the present invention can be applied to a vector graphics display after the scan conversion process, with significant cost savings as contrasted with an uncompressed refresh display of scan converted data.

It is, therefore, a prime objective of the present invention to provide improved apparatus for display image refreshing from a compressed representation.

DESCRIPTION OF THE PRIOR ART

A refresh system for storing and refresh driving a display system including a storage for compressed refresh data is disclosed in a copending patent application SN707,803, filed on July 22, 1976, now U.S. Pat. No. 4,074,254, entitled "An XY Addressable and Updatable Compressed Video Refresh Buffer for Digital TV Display" and assigned to the assignee of the present invention. That refresh system discloses a scheme for compressing the data information of the image for storage in the refresh store together with a means for mapping and controlling the retrieval of the stored information. There is no showing of a means to control an overflow situation.

U.S. Pats. Nos. 3,444,319 to Artyt et al and 3,480,943 to Marber also discloses schemes for compressing data for driving a scanning display device. Neither patent discloses a complete refresh system nor a situation where the pattern is too large to place into the scanning display device at one time.

Therefore, another object of the present invention is to provide a refresh system that can control the overflow and partitioning problems using compressed refresh schemes of the prior art.

Yet another object of the present invention is to provide a refresh compression system that uses an improved partitioning scheme for the image display and uses multiple decompression systems for an orderly raster scan.

SUMMARY OF THE INVENTION

A reproduction system according to the present invention includes a scanner and a compression processor for compressing the scanned image data output for storage in a central processing unit memory store. The image data is selectively retrieved by the display device. The selected image data is decompressed and recompressed for storage in a refresh image store in the display system. An indicator is stored in an increment directory store for each compressed string length stored in the refresh image store and for a store overflow condition. The compressed refresh image is retrieved from the image refresh store as needed for initial display and cycled for refreshing the display. The compressed refresh image is transferred to a refresh controller under control of a synch generator that keeps track of the display scanning line and the necessary image data for that scan line. The compressed refresh image is sequence decompressed in a plurality of decompressors and stored in associated raster buffers for eventual serialization to the display device. An overflow indicator in the increment directory store is provided to alert the operator that, via a system request, more image data can be obtained to complete the image. The image and the new data with appropriate indicators is retrieved and recompressed for storage and display.

The present invention raster display device is designed to present image data and comprises a conversion means for compressing binary coded data representative of a visual image to be displayed and a refresh storage device for storing the compressed binary coded data. Image refresh processing control means are included for dividing the image data into a plurality of non-overlapping image segments. The image processing control means comprises gating means for sequentially activating the conversion means to compress individual segments of the image data. Increment directory storage means are included for storing the control of information representative of the storage address for each of the independent segments of the image as stored in the refresh storage means. A plurality of decompressor means and a plurality of refresh buffers decompress the compressed data and store scan lines for use by the raster display device. Image refresh control means sequentially gate, under control of the increment directory storage means, data segments of the image to one of the plurality of decompressor means. The decompressed image is then directed to an associated refresh buffer. The refresh buffer stores scan lines of the image for reproduction by the raster display device.

The present invention is concerned principally with a refresh system for a raster display device. Standard refresh systems include a refresh memory store for storing compressed coded image data, image processing control means for dividing the image data into a plurality of non-overlapping image segments, and logic control means for accomplishing the function. The present invention further provides an incrementally accessible directory store that stores control information representative of the storage addresses and content information for each coded image information segment together with cyclic image refresh control means for incrementally retrieving the control information and responsive thereto for generating address locations for cyclically and sequentially retrieving the coded image information for conversion and display on the raster display. Further with the present invention, the conversion of the coded image information is performed by a plurality of refresh systems including a plurality of sets of decompression processors and refresh buffer stores.

It is, therefore, an object of the present invention to provide enhanced refresh apparatus for a raster display device.

Another object of the present invention is to reduce the memory store size requirements in a refresh apparatus for a raster display device by the use of an incrementally addressed storage means for storing control information of the image data.

Another object is to provide a reproduction system with an enhanced method and apparatus for controlling the image display and refresh for a raster display device.

Yet another object is to provide a refresh control system for a raster display device that solves the partition problem and the decompressor data rate problem of prior art compressed refresh systems by the use of an incrementally addressed storage means and a plurality of decompression systems.

Still another object is to provide refresh control means for a raster display device that can be used with compression apparatus which process the image as a linear string or which process the image in a two dimensional area scheme.

The display refresh control system of the present invention provides a means for indicating the starting and trailing edges of a partition of an image and a means to control the starting raster scan line for the presentation of an image partition, together with partitioning means for facilitating the use of displays with differing amounts of refresh memory store.

Yet another object is to provide refresh apparatus for a raster display device that operates multiple decompressors in parallel while handling image partitioning with display control logic together with an ability to operate with line and area oriented decompressor schemes.

These and other objects of the present invention will become apparent to those skilled in the art as the description proceeds.

BRIEF DESCRIPTION OF THE DRAWING

The various novel features of this invention along with the foregoing and other objects as well as the invention itself both to its organization and method of operation, may be more fully understood from the following description of illustrated embodiments when read in conjunction with the accompanying drawings wherein:

FIG. 3 is a representation of the contents of the increment directory store of FIG. 2 for an image with three partitioned displays;

FIG. 6 is a representation of the data in the Controller Interface for a fourteen segment image example.

DESCRIPTION OF THE PREFERRED EMBODIMENTS

Figure 1:
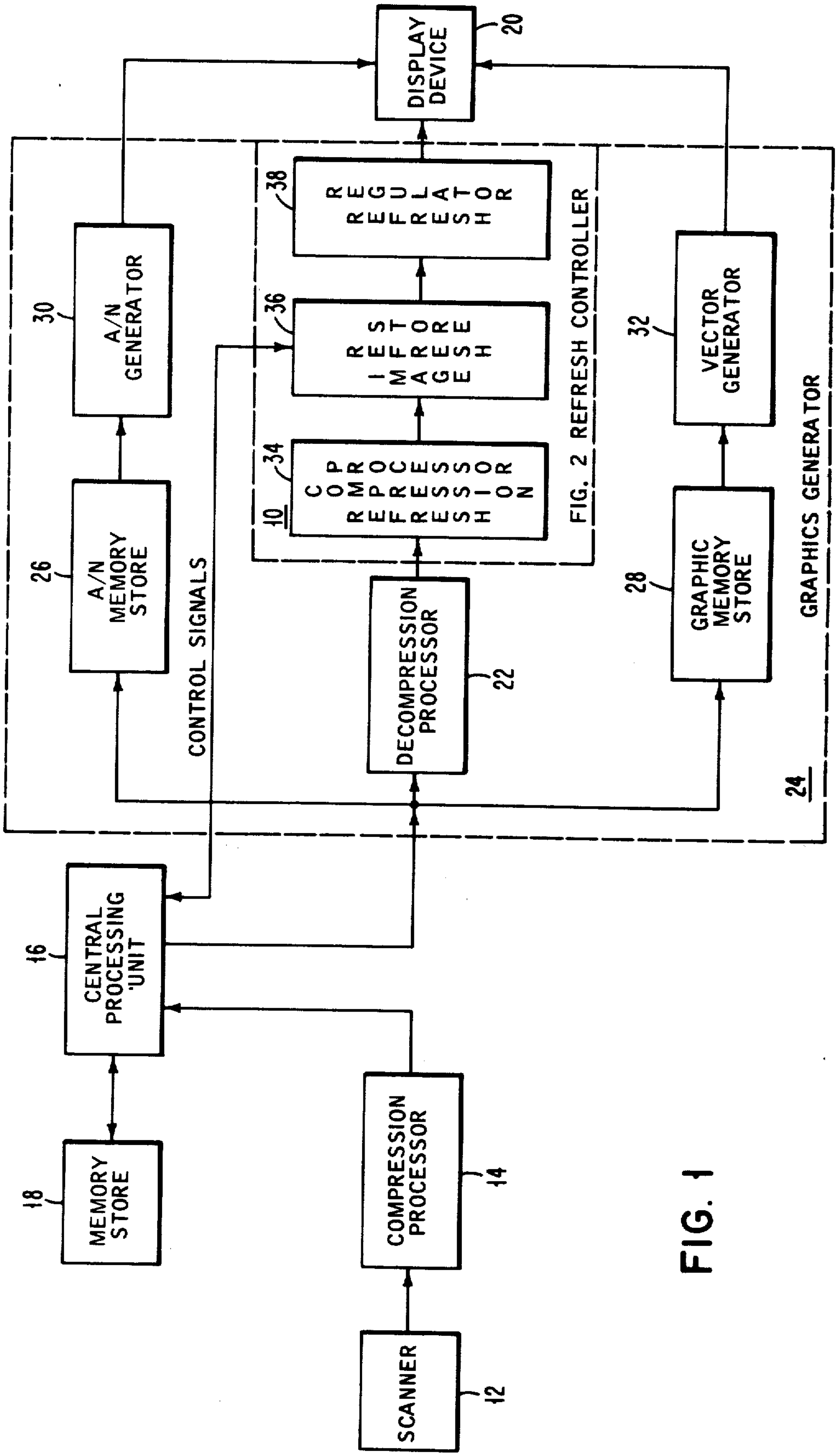
FIG. 1 is a block diagram of the refresh apparatus for use with the raster display device according to the present invention.

In FIG. 1, a complete scanner/display system is shown with a refresh controller 10 according to the present invention. The scanning portion of this system includes a scanner 12, a compression processor 14, and a central processing unit 16 with a memory store 18. The scanner 12 scans an image, picture element by picture element, to obtain binary data information representative of each picture element. The binary data information is directed to the compression processor 14. The compression processor 14 compresses the data information received from the scanner 12 to a binary data format that represents the image in a reasonable number of bits for storage by the central processing unit 16 into its memory store 18.

When the stored image data information is ready for reproduction on a display device 20, control signals are directed to the central processing unit 16 to retrieve the compressed image information. In the preferred embodiment, the display device 20 is preferably a cathode ray tube (CRT) device. To display the compressed image information on the CRT, the data information is directed to a decompression processor 22 of a graphics generator 24 where the data information is reconverted to its original picture element format.

The output of the decompression processor 22, the picture element data information, is directed to the refresh controller 10 which recompresses, stores, decompresses and converts the image data into a visual image on the CRT device 20.

Display information consisting of Alpha Numeric A/N text and line drawings (graphics) can be merged with the image data information in the graphics generator. The ability to merge A/N and vector graphic information with image information at the display provides the ability to "annotate" or "mark up" a scanned image with text or line drawing information.

The data image information from the central processing unit 16 can be directed to an A/N memory store 26 and a graphic memory store 28 of the graphics generator 24. The data information placed into the A/N memory store 26 is directed to an A/N generator 30. The output of the A/N generator 30 is directed to the display 20.

The data information placed in the graphic memory store 28 is directed to a vector generator 32. The vector generator 32 output is directed to the display device 20. U.S. Pat. No. 3,973,245 to Karl Belser entitled "Method and Apparatus for Point Plotting of Graphical Data from a Coded Source into a Buffer and for Rearranging that Data for Supply to a Raster Responsive Device", and assigned to the assignee of the present invention, discloses a computer controller graphics display apparatus which is representative of the function provided by the graphic memory store 28 and the vector generator 32.

In general, the refresh controller 10 comprises a refresh compression processor 34, an image refresh store 36, and a refresh regulator 38. The refresh controller 10 takes the individual binary information of the picture elements from the decompression processor 22 and compresses this information according to the best scheme for refresh compression. This compressed data from the refresh compression processor 34 is stored in the image refresh store 36. The compressed refresh data information is retrieved from the image refresh store 36 by the refresh regulator 38 as required to continually refresh the data image displayed on the CRT display device 20. Each dot of each scan line of the CRT device must be continually repeated in order to keep the image visible on the CRT screen.

There are numerous compression algorithms which can be used within the refresh controller 10, of FIG. 1. The key requirements are ease of implementation and control of maximum data expansion for rare input image bit combinations with compression performance as a secondary factor. The null suppression technique by S. S. Ruth and P. J. Kreutzer, discussed in Datamation, September 1972 at pages 62-66 is a good example of a usable algorithm. There are several suitable algorithms described by T. S. Huang in the International Conference on Communications, Vol. I, Section 7 pp. 7-11.

The algorithm used in the Compression Processor 14 and it the Decompression Processor 22 of FIG. 1 should be selected to maximize compression. Algorithms which maximize compression generally have large data expansion factors (4 or more to 1) for rare input image bit combinations.

Figure 2:
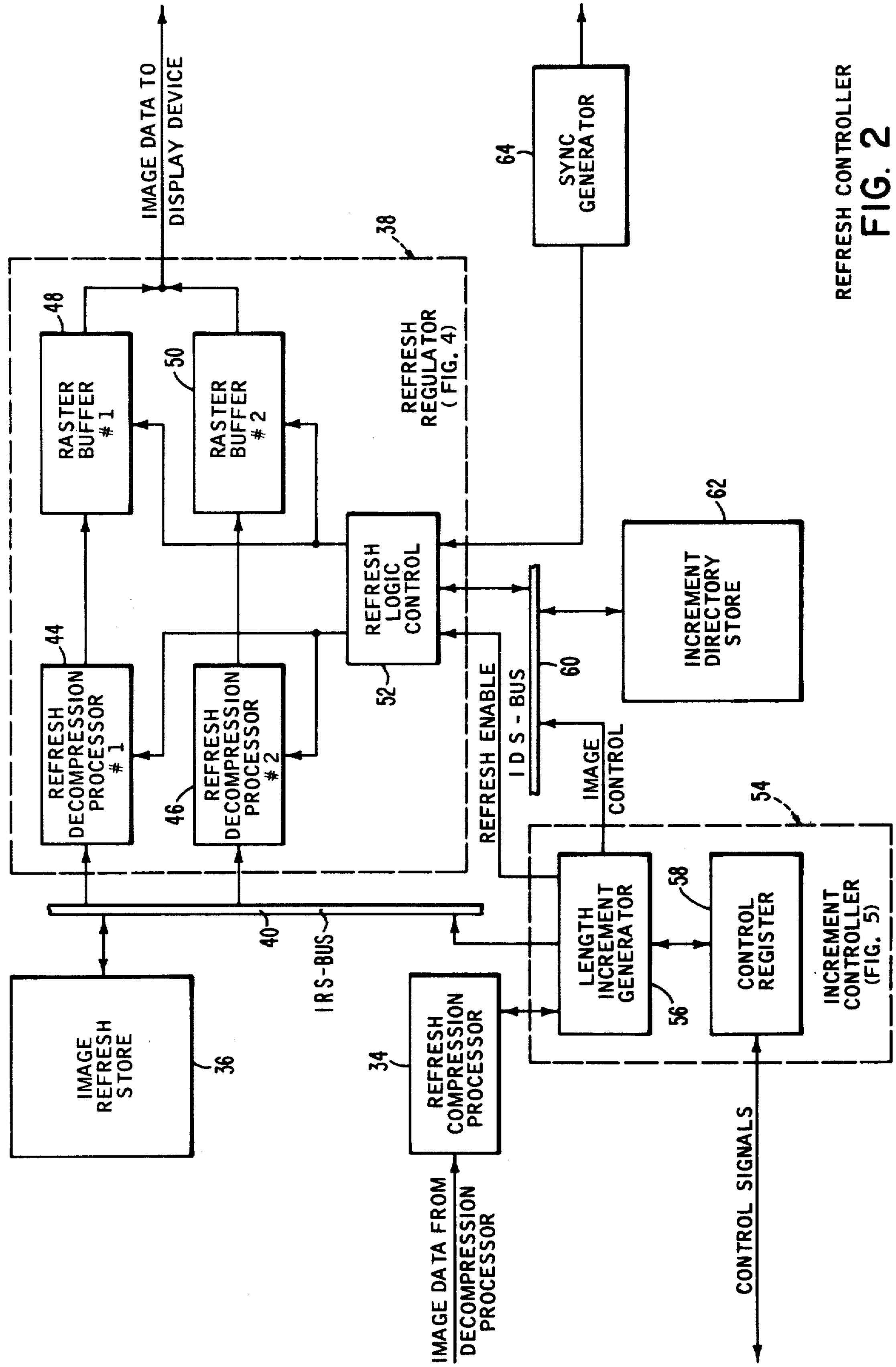
FIG. 2 is a block diagram of apparatus for use as the refresh controller of FIG. 1.
Figure 5:
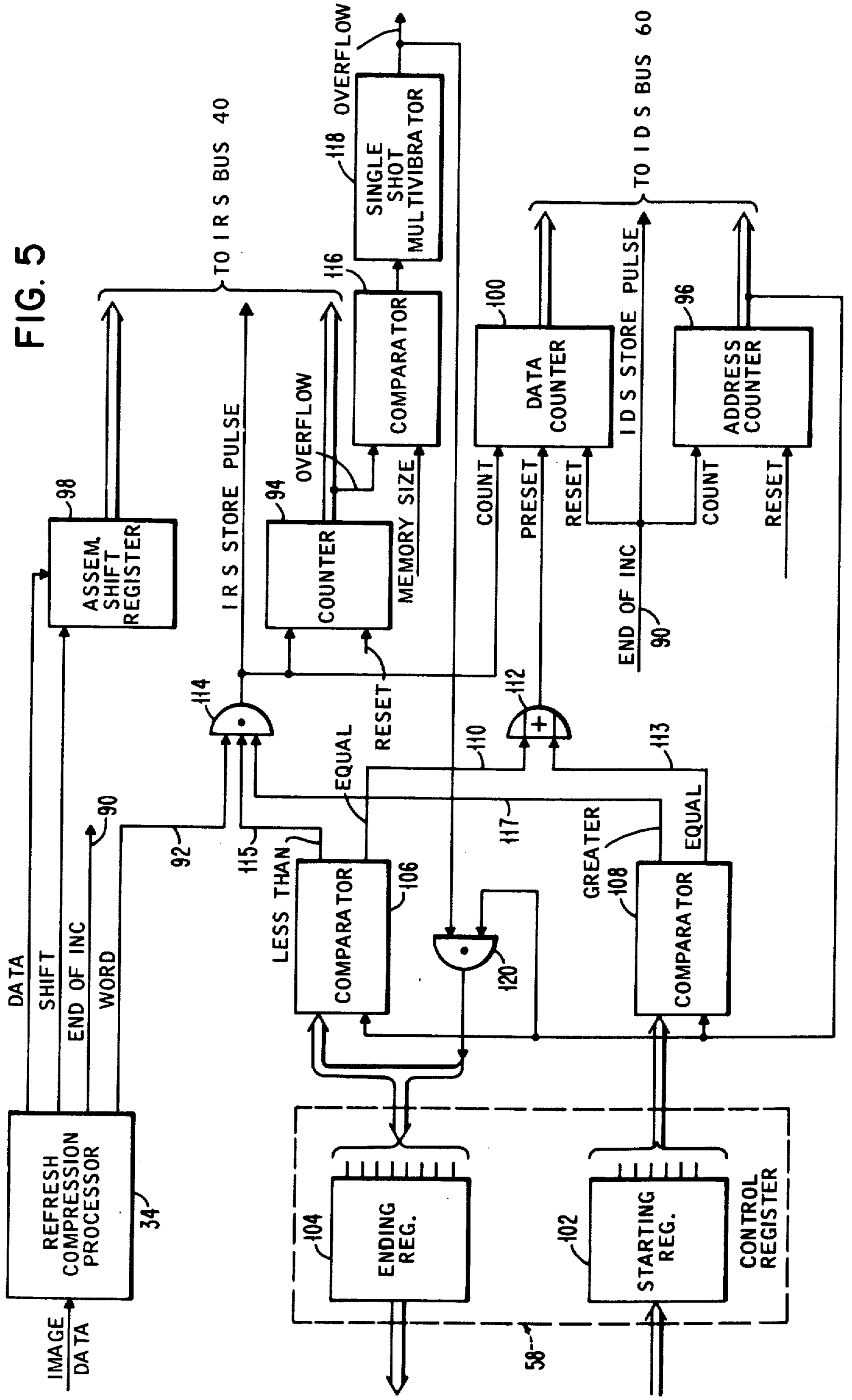
FIG. 5 is a logic diagram of a typical circuit for use as the increment controller of FIG. 2.

The refresh controller 10 controls the amount of data retrieved from the central processing unit 16 for display according to the amount of data information that can be placed onto the screen of the device. This information is compressed by the refresh compression processor 34 and placed into the image refresh store 36. The refresh controller 10 recalls the stored information and controls the decompression of the data in turn through the refresh regulator. The refresh controller 10 retains an indication of the amount of information that is being displayed in the event that the data information to be displayed exceeds the size of the image data store 36 and the amount of information that can be displayed at one time. When the amount of data information overflows the display capacity, the refresh controller 10 recalls, under operator control, the next block of data from the central processing unit 16 for decompression by the decompression processor 22 for compression by the refresh compression processor 34 and for storage in the image data store 36 to display the next block of data information through the refresh regulator 38. A block diagram for the refresh controller 10 is shown in FIG. 2. Referring to FIG. 2, the refresh controller includes the refresh compression processor 34 directing data to the image refresh store 36 via an IRS bus 40. The compressed data stored in the image refresh store 36 is directed by the IRS bus 40 to the refresh regulator 38 which includes two refresh decompression processors 44 and 46, two raster buffers 48 and 50, and a refresh logic control 52. More than two decompression processors and two raster buffers can be used to reduce instantaneous peak decompression data rates. The refresh regulator 38 generates the image data signal which provides the image to be displayed on the CRT device. The refresh regulator 38 is controlled by an increment controller 54 which includes a length increment generator 56 and a control register 58. A logic diagram of a typical logic circuit that could be used for the increment controller 54 is shown in FIG. 5 and will be discussed later.

The control register 58 accepts the control signals from the central processing unit 16 and also generates the control signals from the refresh controller 10 to the central processing unit 16 when more data or a new image is to be displayed. The increment controller 54 controls the refresh regulator 38 by a REFRESH ENABLE signal directed to the refresh logic control 52. The length increment generator 56 via an IDS bus 60 stores an indication of the data information stored in the image refresh store 36 in an increment directory store 62. The increment directory store 62 stores a set of control indicators which is representative of the image data being displayed. The increment directory store 62 contains information required by the refresh regulator 38, in order to locate the starting address in the image refresh store 36 of variable string lengths which contain the compressed representation of each image increment. There is one entry in the increment directory store 62 for each image increment on the CRT display surface. For example, if a simple linear compression scheme were used, then there would be one entry per raster scan line on the display device. In a linear compression scheme, one image increment represents one scan line. If a two-dimensional compression scheme were used, then there would be one entry in the increment directory store 62 for every two dimensional area image increment on the CRT display surface. The image refresh store 36 holds the compressed representation of the image actually being presented on the CRT display. The refresh compression processor 34 processes the entire image as a collection of non-overlapping image increments each of which is compressed separately.

The refresh regulator 38 and in particular, the refresh logic control 52, provides the means for interpreting the contents of the increment directory store 62 in order to control the refresh data access to the image refresh store 36 and to control the generation of the starting and trailing edge indication of a partition image. To provide a better description of the refresh controller 10 of FIG. 2, the process of retrieving an image from the memory store of a central processing unit and its eventual display will be discussed.

A particular compressed image is requested from the memory store 18 by sending a location address to the central processing unit 16. The compressed data from the memory store 18 is directed to the decompression processor 22 (see FIG. 1). The image data from the decompression processor 22 is directed to the refresh compression processor 34 (see FIG. 2). A description of loading an uncompressed image whose compressed representation will fit into the image refresh store 36 will be provided first. Then a description of loading an image which is too large for the image refresh store will be provided.

The central processor starts by loading the control register 56 with a set value such as all zeroes to indicate that a new image is being processed. The uncompressed image data serial bit stream is compressed by the refresh compression processor 34 which implements the display refresh system compression scheme. The data output of the refresh compression processor 34 is assembled into words for storage in the image refresh store 36. When the compressed representation of the first image increment has been stored in the image refresh store 36, the length of the compressed representation of the first image increment is placed into the first entry in the increment directory store 62. The next image increment is compressed and stored in the image refresh store 36 with subsequent storage of the compressed representation in the next entry in the increment directory store 62. This process continues until all image increments have been processed. At the completion of the input process, the image refresh store 36 will contain the compressed representation for each image increment on the display and the increment directory store 62 will contain the length information required to locate the start of the compressed representation of each image increment.

An absolute addressing scheme for the image refresh store 36 could be developed rather than the relative length based addressing used in the preferred embodiment. The absolute addressing scheme would require more address bits in each entry of the increment directory store 62 and a slightly more complex control means for handling partition information. In this preferred embodiment, the image refresh store address of the start compressed representation of an image increment *i* can be easily computed from the first *i*-1 entries in the increment directory store 62.

When the number of image increments sent from the central processing unit to be displayed is less than the maximum number to fill the CRT screen, the unused entries in the increment directory store 62 are filled with the value 0. An increment directory store entry value of 0 when detected during the refresh process means that there are no information bits in the image increment and therefore the refresh regulator 38 will emit an all "white" image increment.

The next process assumes that the compressed representation of the image as compressed by the refresh compression processor 34 will not fit into the image refresh store 36.

First, the manner in which the partition boundaries are generated will be described. The refresh regulator 38 generates a partition boundary pattern when the entry in the increment directory store 62 is equal to a special value, called partition mark. The partition mark could have the value the nth power minus 1, where *n* is equal to the number of bits per entry. If the indicator in the increment directory store 62 is not 0 (the special indicator for emitting an all white pattern) or the partition mark value, the associated image increment is generated from the compressed representation stored in the image refresh store 36 directly. Such direct reproduction can take place through the refresh regulator. The partition boundary pattern is used to provide the operator with a visual indication of the image boundary when a partial image is being displayed and is generated when a partition mark value is the controlling value in the increment directory store.

In the most simple case, the boundary pattern could be an all black image increment. In the general case, the partition boundary pattern would be stored as a fixed pattern in a "read only storage" extension to the image refresh store. This would allow the use of complex boundary indicator patterns without incurring the cost of special purpose pattern generator logic. Loading of the image proceeds as in the previous example. When the image refresh store overflow condition is reached, the image increment number causing the overflow condition is placed into the control register 58 by the length increment generator 56. The value indicator associated with the partition boundary pattern is stored in the increment directory store 62 in the next several positions and the value 0 is stored in each remaining position of the increment directory store. The contents of the control register 58, the overflow increment value denoted *j*, is transmitted back to the central processing unit as part of the ending status. When all data has been stored in the IRS, the length increment generator starts the refresh process by sensing the refresh enable signal.

FIG. 3 summarizes the contents of the increment directory store 62 for an image which requires 3 partition showings on a display device having 1000 scan lines. A linear compressor is used, that is, each image increment is equal to one full scan line. Under contents, the L(*x*) representation is the length in bytes of the compressed representation of scan line *i* as stored in the image refresh store. The partition mark value is equal to 255 in the example shown in FIG. 3. Thus, the partition boundary will be displayed for each line having the indication 255. Partition 1 contains image lines 1 through 385 with a partition mark displayed in 386, and an all white image for the remainder. Partition 2 starts all white; has a partition mark in line 376, then shows image lines 377 through 892 and a partition mark in line 893 followed by an all white image representation through line 1000. Partition 3 starts with an all white image, has a partition mark in 883 and then shows an image at lines 884 through 1000.

To display the subsequent partition of the example image, the central processing unit preloads a starting image increment value into the control register 58. Normally, this value will be some number of image increments earlier in the image than where the overflow occurred, *j*-10 for the example shown in FIG. 3. For partition 1, *j* is equal to 386 and for partition 2, *j* is equal to 893. The earlier image increments provides a visual overlap of the previous image partition with the current partition. The central processing unit retransmits the entire image for refresh preprocessing. The image is decompressed by the decompression processor 22, compressed again by the refresh compression processor 34 and directed to the image refresh store 36. When the control register 58 contains a value other than 0, the increment controller 54 controls the loading of the image refresh store and the increment directory store 62. The value 0 is placed in each entry of the increment directory store 62 by the increment controller 54 until the IDS entry *i* being processed by the refresh compression processor 34 is equal to that specified in the control register 58. A value that generates the partition boundary pattern is placed in entry *i* in the IDS. The compressed representation for subsequent image increment ($i+1$, $i+2$, etc.,) is directed to the image refresh store starting with the first address of the image refresh store. the development of the compressed representation proceeds as before for the remainder of the image to be displaced.

Figure 4:
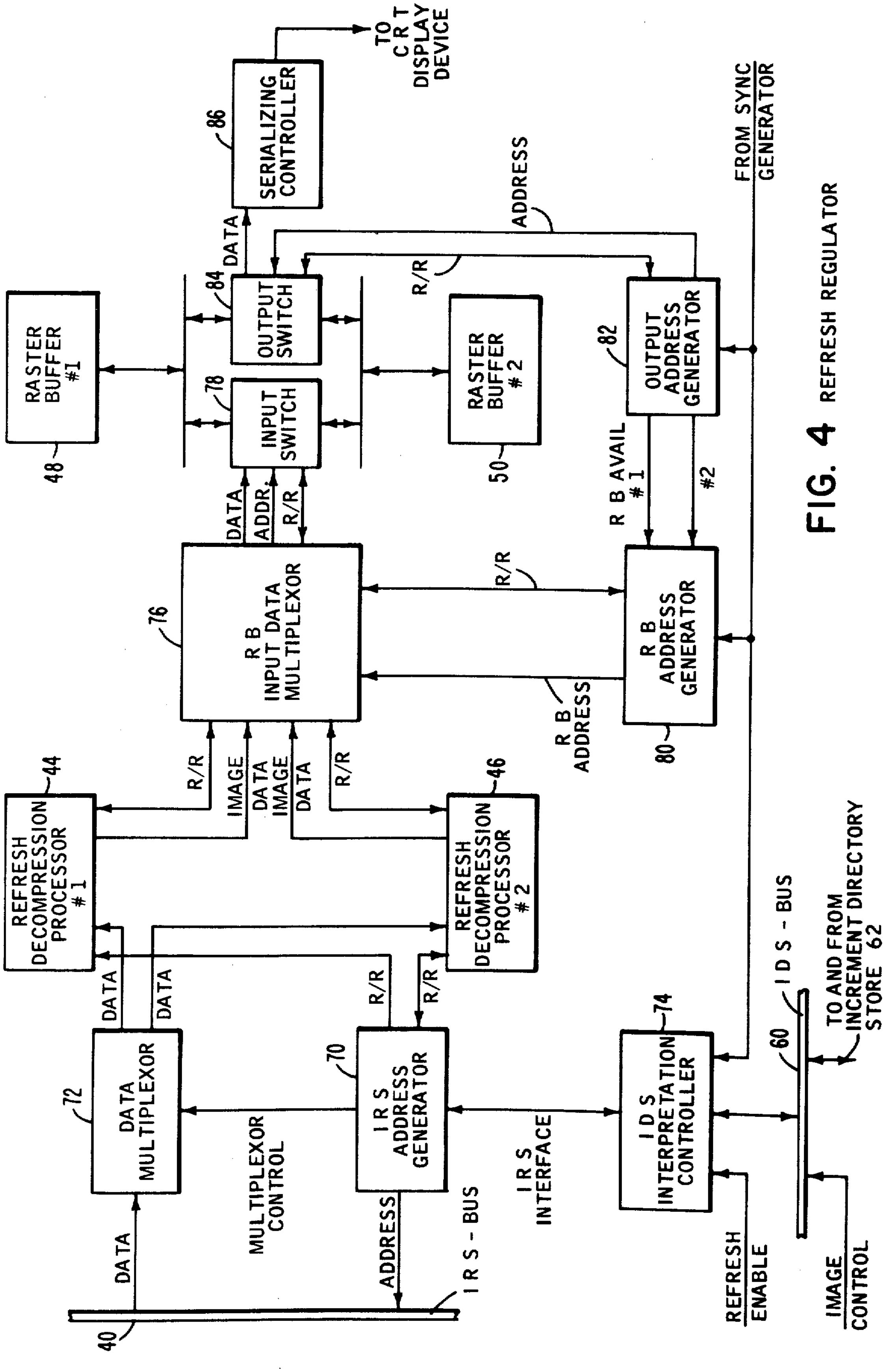
FIG. 4 is a block diagram of apparatus for use as the refresh regulator of FIG. 2.

After the compressed representation of the image has been stored in the image refresh store 36 and the refresh control data has been stored in the increment directory store 62, the refresh regulator 38 takes control to initiate the display of the image and the refresh process. A block diagram of the refresh regulator 38 is shown in FIG. 4. The refresh regulator 38 provides the means for controlling the starting and stopping of each refresh decompression processor and for generating the address used by each decompression processor to access the image refresh store. The refresh regulator interprets the contents of each entry in the increment directory store to insure that the appropriate data is produced by each refresh decompression processor. The refresh regulator also provides the timing synchronization between the synch generation by the synch generator and the raster buffers currently generating the data stream for the CRT display device. The refresh regulator incrementally retrieves control information from the increment directory store 62 and is responsive thereto to generate address locations for cyclically and sequentially retrieving the coded image information from the image refresh store 36 for conversion by the refresh decompression processors 44 and 46 and display on the raster display device.

Referring to FIG. 4, the refresh regulator 38 includes an IRS address generator 70 for generating the addresses to retrieve the data from the image refresh store and a data multiplexor 72 for receiving the data from the image refresh store via the IRS bus 40. The data multiplexor 72 directs the compressed image data to either refresh decompression processor #1 or #2. An IDS interpretation controller 74 takes the information from the increment directory store 62 and controls the operation of the refresh regulator. The image data from the refresh decompression processors is directed to an RB input data multiplexor 76 and then to an input switch 78 which switches the image data flow to either the raster buffer #1 or to raster buffer #2, depending on which buffer is available for input data. An RB address generator 80 generates the raster buffer address when activated by the RB available signal generated by an output address generator 82. The output address generator 82, when activated by the synch generator 64, activates an output switch 84 to retrieve the image data from either of the raster buffers 48 or 50, depending on the last one filled with image data. The raster buffers through the output switch 84 directs the data signals to a serialization controller 86 which serializes the data for transmission to the CRT display device.

The increment controller 54 (FIG. 2) activates the REFRESH ENABLE signal line to initiate the refresh process. When the IDS interpretation controller 74 detects the fact that the REFRESH ENABLE signal line has been activated, it enters the initialization state in preparation for starting the refresh cycle. The refresh cycle will continue as long as the REFRESH ENABLE line is active. The output address generator 82 translates display scan line numbers received from the synch generator 64 into raster buffer addresses. In addition, the output address generator 82 controls the transfer of the uncompressed image data from each raster buffer.

Activation of the REFRESH ENABLE line is detected by the RB address generator 80 via the IDS interpretation controller 74. The RB address generator 80 provides the raster buffer addresses for each refresh decompression processor image data word output. There is a fixed one-to-one mapping from any data position on the display surface to a raster buffer and to an address within that raster buffer. The address mapping is cyclic over th display surface. The address generation cycle for each refresh decompression processor is reset at initialization time. At initialization, the IDS interpretation controller 74 generates the fetch address signal and interprets the first entry in the increment directory store. The address data required to decompress the first segment is transferred from the IDS interpretation controller 74 to the IDS address generator 70 over the image refresh store interface, IRS bus 40. The data as addressed is retrieved from the image refresh store, directed onto the IRS bus 40 and into the data multiplexor 72 for direction to the refresh decompression processor 44.

After starting the refresh decompression of segment 1, the IDS interpretation controller 74 fetches the second entry from the increment directory store, interprets it and transfers the address data required to decompress the second segment to the IRS address generator 70. The IRS address generator 70 will generate the address to fetch the data from the image refresh store for direction through the data multiplexor 72 to the refresh decompression processor 46.

When a refresh decompression processor signals that it has completed generation of an image increment and a raster buffer is available, the IDS interpretation controller 74 processes the appropriate entry from the increment directory store 62 and restarts the appropriate decompression processor as defined above. When a raster buffer is not available, refresh decompression processing is held pending activation of the appropriate raster buffer available line. The refresh decompression processors operate independently of each other but under control of the RB address generator 80 and the IDS interpretation controller 74.

The IRS address generator 70 and the data multiplexor 72 interface the refresh decompression processors to the IRS bus 40 and the image refresh store 36. The IRS address generator provides the incremental address generation needed to retrieve compressed data from the image refresh store on an "as needed" basis by each refresh decompression processor. The address information provided by the increment directory store 62 via the IDS interpretation controller 74 provides the starting addresses of the compressed representation of image increments in the image refresh store and the length of the compressed representation of the segment. The IRS address generator 70 develops the intermediate image refresh store word addresses.

The two raster buffers 48 and 50 operate in ping-pong mode. Each raster buffer has sufficient capacity to hold some small number of image increments, usually one increment per refresh decompression processor. The refresh decompression processors develop the uncompressed representation of image increments as the image data in one raster buffer and then releases that raster buffer for use in refreshing part of the CRT surface. When the content of a raster buffer has been used for refresh purposes, that raster buffer is marked available for back filling with new image increment data. The IDS interpretation controller 74 will initiate decompression of image increments as soon as a raster buffer is available. The capacity of the raster buffers must be sufficient to hold one image increment for each refresh decompression processor.

It may be desirable to transmit compressed image data across the system interface between the central processing unit and the refresh controller. For this system a system decompression processor is placed in the display input data path between the central processing unit and the display compression processor. Most schemes that are designed to maximize compression do not provide an advantage in their use in a compressed refresh display due to the excessive peak data rates that they can require even though they yield a better average compression ratio.

The refresh apparatus for a raster display device according to the present invention includes a compression means, refresh compression processor 34, for converting noncoded raster information to a coded compressed representation. The coded compressed representation is stored in a master memory store, the image refresh store 36, in continuous string lengths. A directory store, the increment directory store 63 stores a memory map of an indication of the beginning of individual scan lines and an indication of an overflow condition wherein the master memory store is full. A decompression means, the decompression processors 44 and 46, includes means, the IRS address generator 70, for extracting the stored coded compression representation from the master memory store and means, the IDS interpretation controller 74, for extracting scan line length information from the directory store. Refresh buffers, raster buffers 48 and 50, are included for storing the scan line information and include associated means for directing each scan line into the raster display device. Means, the increment controller 54, are included for sensing the overflow condition of the master memory store and for requesting noncoded raster information, via the IRS address generator 70, to identify and retrieve the initial active scan line for displaying on the display device in response to the overflow condition sensing means.

Stated differently, the present invention raster conversion means includes the compression means for converting the noncoded raster information to a coded compressed representation for storage in the master memory store according to continuous string lengths. The directory store stores an indication of the beginning of the individual continuous string lengths. A generator means, the length increment generator 58, places the coded compressed representation into the master memory store and indicates to the directory store the beginning of the individual continuous string lengths. Sensing means, the increment controller 54, senses the overflow condition of the master memory store by comparing the address generator to the last physical address stored in the memory store. Communicating means, the control register 56, responsive to the sensing means, identify and retrieve the initial active scan line for display by the display means. Indicating means in the sensing means indicate the completion of the master memory store loading. The indicating means generates a REFRESH ENABLE signal to activate the display device to refresh the displayed scan line in a cyclic manner.

In FIG. 5, a logic circuit that could be used as the increment controller 54 of FIG. 2 is shown. The logic design shown should not be taken as limiting the present invention since the circuitry is conventional and represents standard design familiar to a person skilled in the logic and image processing arts.

Referring to FIG. 5, data is transmitted serially into the refresh compression processor 34 where it is converted into a more compressed representation. The compression processor 34 indicates the fact that an input image increment has been processed by a pulse on the end of increment signal line 90. The processor 34 indicates that one word of compressed data has been loaded into an assembly shift register 98 by a pulse signal on the word line 92.

All counters and control logic are reset at the start of the image load process. A counter 94 supplies the memory address sequence required to load the image refresh store 36 and an address counter 96 supplies the memory address required to load the increment directory store 62 via IDS bus 60. The data to be stored into the image refresh store is developed in the assembly shift register 98. The data to be stored into the increment directory store is developed in a data counter 100. The end of increment signal line 90 from the refresh compression processor 34 indicates that one image increment has been compressed, and its data, now stored in the data counter 100, should be stored in the increment directory store 62. A pulse appears on the word line 92 from the refresh compression processor 34 each time the assembly shift register 98 has been filled.

The end of increment pulse on signal line 90 will cause the value held in data counter 100 to be stored in the increment directory store via the IDS bus 60 at the location specified by the address counter 96. The trailing edge of the end of increment pulse will cause the data counter 100 to reset and the address counter 96 to increment by 1. When the value of the address counter 96 is greater than the value of a starting increment register 102 of the control register 58 and is less than the value in an ending increment register 104 of the control register 58, the value held in the data counter 100 will be zero. The sampling is done in a set of comparators 106 and 108. The comparator 106 compares the value of the ending register 104 with the value in the address counter 96. If the values are equal, then a signal is directed on the equal signal line 110 to an OR gate 112 to preset the data counter 100. Likewise if the value of the address counter 96 is equal to the starting register 102 value, then the comparator 108 will direct a signal on its equal signal line 113 to the OR gate 112 to preset the data counter 100. The comparator 106 generates a signal on signal line 115 to an AND gate 114 when the values of the address counter 96 is less than the value in the ending register 104. The comparator 108 generates a signal on signal line 117 to the AND gate 114 when the value in the address counter 96 is greater than the value in the starting register 102. Thus, the word signal is transmitted through the AND-gate 114 whenever the address counter 96 is between the starting and ending values as determined by the control register 58.

When the value in the address counter 96 equals either the starting increment value in the starting register 102 or the ending increment value in the ending register 104, either comparator 108 or 106, respectively, will preset the value in the data counter 100 to the partition boundary pattern value via the OR-gate 112. When the value in the address counter 96 is between the starting and ending increment values, as determined by the values in the control register 58, the value in counter 94 and data counter 100 will increment by 1 for each word to be stored in the image refresh store for that image increment. When the end of increment pulse occurs from the refresh compression processor 34, the value in the data counter 100 will be equal to the number of words in the image refresh store 36 used to store the compressed representation of that increment.

Compressed data which was assembled for storage in the image refresh store is only stored when the value of the counter 96 is between the starting and ending increment values. This condition is established by the output of comparators 106 and 108. An IRS data store cycle is taken for each occurrence of the word pulse under control of the address counter 96 value. AND gate 114 inhibits the word pulse from causing a data storage cycle based on the comparator outputs. the trailing edge of the IRS store pulse increments the IRS memory address counter 94.

When the memory address value held in counter 94 is greater than the IRS memory size, a comparator 116 is activated causing the image increment value stored in the address counter 96 to replace the value in the ending register 104 of the control register 58.

The output of the comparator is directed to a single shot multivibrator 118 to obtain a single pulse output to indicate the overflow condition. This output is directed to a series of AND-gates represented in the figure as a single AND-gate 120. The second leg of the AND-gate 120 is connected to the output value of the address counter 96. The output of the AND-gate 120 loads the value in the address counter 96 into the ending register 104.

This change of value in the ending regster 104 of the control register will cause the preset value to be placed in data counter 100 for the subsequent IDS store cycle and will also inhibit further storage in the image refresh store.

The detail functioning of the IDS interpretation controller 74 is best introduced with an example; FIG. 6 shows all of the pertinent address and length data for an example of a partial image on a display with fourteen image segments. In this example, both the all white image segment and the partition mark segment will be generated from a read-only storage extension to the image refresh store 36. We will assume that the store Locations 0-16383 will be used to store variable compressed data, that Locations 16384-16386 will contain the compressed representation of an all white segment having a length of three, and that locations 16387-16415 will contain the compressed representation of the partition mark segment having a length of thirty one. The IDS interpretation controller 74 will transfer a starting address and word count to the IRS address generator 70 for each image segment to be processed by refresh decompression processors 44 and 46.

FIG. 6 illustrates the data which is contained within the increment directory store 62 and the corresponding information which is transferred to the IRS address generator 70. In this example segments 1–5 contain an all white image; segment 6 contains a partition mark image; segments 7 through 11 contain actual image information to be displayed; segment 12 contains the partition mark image; and segments 13 and 14 contain the all white image. The memory address used to fetch the starting byte of compressed data is shown in the column labeled memory address. The compressed data is used to generate each individual image segment. Recall that the all white image is stored starting at memory address 16384 and that the partition mark image is stored starting at Location 16387. Also recall that the compressed image segment information was stored in consecutive locations in the image refresh store 36 during the loading process described earlier. Segment 7 is stored starting at location 0, segment 8 begins at location 35, segment 9 begins at location 56, etc. The length of each segment is also passed to the IRS address generator 70 so that it can control the number of words to be physically transferred for the generation of each segment by each refresh decompression processor. The location and the length of the all white image segment and partition mark image segment are data constants that are to be transferred to the IRS address generator when either of these segments are to be displayed on the screen.

Figure 7:
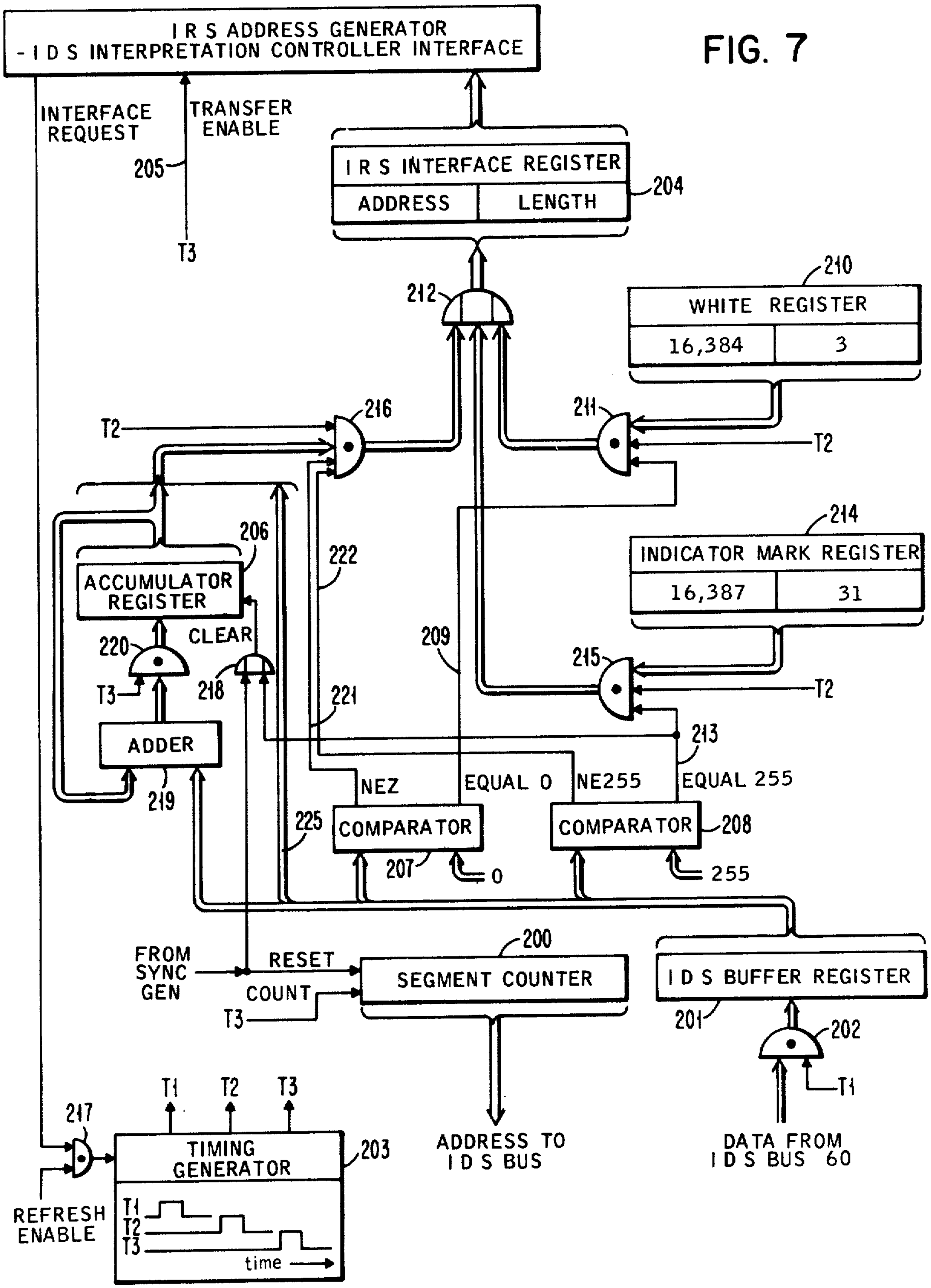
FIG. 7 is a logic diagram of a typical circuit for use as the IDS interpretation controller of FIG. 4.

FIG. 6 illustrates the input and output data relationships which must be implemented within the IDS interpretation controller 74 for this example. FIG. 7 illustrates a suggested embodiment of the logic circuitry for the IDS interpretation controller 74. Data is processed sequentially by segments which means that the address used to reference information within the Increment Directory Store 62 can be obtained from a simple segment counter 200. Data received from the IDS bus 60 is stored in an IDS buffer register 201 via an AND-gate 202 at time T1.

Sequential timing control of the data transfer processes which take place internally within the IDS interpretation controller 74 are supplied by a timing generator 203. Timing generator 203 provides three sequential time pulses. Pulse T1 is a read strobe pulse used to obtain data from the increment directory store. Pulse T2 transfers data from the output of the IDS buffer register 201 through the logic to an IRS interface register 204. Pulse T3 activates an IRS transfer enable signal line 205, steps the segment counter 200, and causes an add cycle to take place using the output of an accumulator register 206 and the IDS buffer register 201 to generate a new address constant in the accumulator register 206.

The output signals from the IDS buffer register 201 is directed to comparators 207 and 208 which are used to identify the increment directory store data values. These data values signal the occurrence of an all white image segment or the occurrence of a partition mark segment. If the data from the IDS bus 60 indicates that a white segment should be generated, the EQUAL 0 signal line 209 output of comparator 207 will be active and the address constant held in a white register 210 will be gated through an AND-gate 211 at time T2, through an OR-gate 212, and into the IRS interface register 204. If the data from the increment directory store called for the presentation of the partition mark image, the IDS buffer register would contain a 255 signal representation and the EQUAL 255 signal output line 213 of the comparator 208 would be active and the address constant indicated mark from register 214 would be gated through an AND-gate 215 at time T2, and into the IRS interface register 204 via the OR-gate 212. If the data received from the IDS bus 60 is neither 0 nor 255, then the data received from the IDS bus 60 is length information associated with a compressed image segment. In that case, the data from the increment directory store 62 is directed to the IDS bus 60, through AND-gate 202 at time T1 into IDS buffer register 201, and via a cable 225 to an AND-gate 216 and the OR-gate 212 to the IRS interface register 204 at time T2 in parallel with the content of the accumulator register 206.

The operation of refresh begins with activation of the refresh enable signal from the length increment generator 56 and a signal from the synch generator 64 which indicate that the refresh cycle is to commence. These two signals are combined in an AND-gate 217 and the resulting signal is used to initiate one three pulse cycle of the timing generator 203. After data for the first segment to be generated has been transferred to the IRS address generator through the IRS interface register 204, an interface request pulse will be received from the IRS address generator which indicates that the next segment is ready to be generated and that the IDS interpretation controller should begin a new three pulse timing cycle. This process will continue transferring data from the IDS bus to the IRS address generator each time an interface request signal is received from the IRS generator.

The accumulator register 206 is cleared on each pulse from the synch generator and the EQUAL 255 signal via an OR-gate 218. At time T3, the contents of the accumulator register is changed according to the old contents of the accumulator register and the contents of the IDS buffer register 201. Both signals are directed to an adder 219 and the added signals are gated into the accumulator register 206 at time T3 via the AND-gate 220. The new address constant in the accumulator register 206 is transferred in parallel with the IDS buffer register 201 at time T2 via AND-gate 216, provided the comparators 207 and 208 are not equal to zero or not equal to 255 as represented by signal lines 221 and 222, respectively.

The principles of the present invention have now been made clear in an illustrative embodiment. There will be immediately obvious to those skilled in the art many modifications of structure, arrangement, proportions, the elements, materials and components used in the practice of the invention. For instance, the block diagrams shown in the figures and the circuits usable for the blocks are merely representative of the functions necessary in the performance of the present invention. The appended claims are, therefore, intended to cover and embrace any such modification within the limits only of the true spirit and scope of the invention.

I claim:

1. A raster display device refresh system comprising:

a refresh memory store having coded image information segments representing a visual image and stored in addressible locations;

converter means for converting said coded image information into non-overlapping non-coded raster information for visual display on a raster display, said converter means including a plurality of decompressor means for decompressing said coded image information segments into non-coded raster information and a plurality of refresh buffer means, one associated with each decompressor means for intermediate storage of said non-coded raster information for use by the raster display;

means for generating control information representative of the storage addresses and content information for each of said coded image information segments;

an increment directory storage means for storing said control information at incrementally addressible locations; and cyclic image refresh control means for incrementally retrieving control information from said increment directory store and responsive thereto for generating address locations for cyclically and sequentially retrieving said coded image information from said refresh memory store for conversion by said converter means and display on said raster display.

2. A raster display device refresh system as defined in claim 1 further including:

means responsive to said increment directory storage means for generating an overflow indicator signal indicative of an overflow image too large for a single display, said overflow indicator signal controlling said refresh memory store to limit the coded image information segments stored therein.

3. A raster display device refresh system as defined in claim 2 further including:

means for partitioning the coded image information segments in response to said overflow indicator signal; and means for generating a partition boundary representation in said increment directory storage means to define the partitioned visual image data for display on the raster display.

4. A raster display device refresh system as defined in claim 3 including:

means for retrieving the remaining coded image information for storage in said refresh memory store; and means for activating said means for generating a partition boundary to identify the retrieved remaining coded image information as part of an overflow image for display on the raster display.

5. A raster display device refresh system comprising:

compression means for compressing coded image data representative of a visual image to be displayed into compressed image segments;

a refresh image store for storing said compressed image segments of visual image data at addressible storage locations;

means for generating control information representative of the storage address for each of said compressed data segments of said image stored in said refresh storage means;

an increment directory storage means for storing said control information at incrementally addressible locations;

a plurality of decompressor means for decompressing said compressed image segments;

a plurality of refresh buffer means, one associated with each decompressor means; and cyclic image refresh control means including means for incrementally retrieving control information from said increment directory storage means said cyclic image refresh control means cyclically and sequentially gating, under control of said retrieved control information, compressed image segments from said refresh storage means to one of said decompressor means and then gating decompressed image segments to one of said refresh buffer means, each of said plurality of decompressor means and refresh buffer means gated in turn for refresh of the image produced by a display device at a data rate to adapt the decompression data rate to the data rate requirement of said display device.

6. A raster display device refresh system as defined in claim 5 wherein said increment directory storage means includes an overflow indicator that generates a signal indicative of an overflow image too large for a single display and further including:

means for generating a partition boundary signal in response to said overflow signal for display on said display device; and means for retrieving further coded data of the visual image, said partition boundary generating means generating a partition boundary to identify said further coded data.

7. A raster display device refresh system including conversion means for compressing coded image data representative of a visual image to be displayed, a refresh storage means for storing said compressed coded image data, image processing control means for dividing said image data into a plurality of non-overlapping image segments, said image processing control means including logic means for sequentially activating said conversion means to compress individual data segments of said coded data and to place the data representing the compressed data segment in said refresh storage means at addressible storage locations; wherein the improvement comprises:

means for generating control information representative of the storage address for each of said compressed data segments of said image stored in said refresh storage means;

an increment directory storage means for storing said control information at incrementally addressible locations;

a refresh regulator means for decompressing said compressed data segments of said image into non-overlapping image segments for use by the raster display, said refresh regulator means including a plurality of decompressor means for decompressing said compressed data segments of said image into non-overlapping image segments for use by the raster display and a plurality of refresh buffer means, one associated with each decompressor means for storage of said image segments intermediate said associate decompressor means and said raster display; and cyclic image refresh control means including means for incrementally retrieving control information from said increment directory storage means, said cyclic image refresh control means cyclically and sequentially gating, under control of said retrieved control information, compressed data segments of said image from said refresh storage means to one of said decompressor means and then gating said decompressed image segments to one of said refresh buffer means for refresh of the image produced by a raster display at a data rate to adapt the decompression data rate to the data rate requirement of said raster display.

8. A raster display device refresh system as defined in claim 7 further including:

overflow indicator means for generating an overflow signal indicative of coded image data too large for a single display, said overflow indicator signal controlling the accessing of coded image data for compression by said conversion means;

means for generating a partition boundary signal in response to said overflow signal for display on the raster display device; and retrieving means for retrieving further coded image data of the visual image, said means for generating a partition boundary being activated by said retrieving means for generating a partition boundary to identify said further coded image data.

9. A raster display device refresh system including:

a refresh memory store having coded image information segments representative of a visual image and stored in addressible locations;

converter means for converting said coded image information into non-overlapping non-coded raster information for visual display on a raster display; and cyclic image refresh control means for generating address locations for cyclically and sequentially retrieving said coded image information from said refresh memory store for conversion by said converter means and display on said raster display;

wherein the improvement comprises:

means for generating control information representative of the storage addresses and content information for each of said coded image information segments;

an increment directory storage means for storing said control information at incrementally addressible locations;

means responsive to said increment directory storage means for generating an overflow indicator signal indicative of an overflow image too large for a single display, said overflow indicator signal controlling said refresh memory store to limit the coded image information segments stored therein;

means for partitioning the coded image information segments in response to said overflow indicator signal; and means for generating a partition boundary representation in said increment directory storage means to define the partitioned visual image data for display on the raster display;

said cyclic image refresh control means including means for incrementally retrieving control information from said increment directory store and responsive thereto for generating said address locations for said refresh memory store.

10. A raster display device refresh system as defined in claim 9 wherein said converter means includes:

a plurality of decompressor means for decompressing said coded image information segments into non-coded raster information; and, a plurality of refresh buffer means, one associated with each decompressor means for intermediate storage of said non-coded raster information for use by the raster display.

11. A raster display device refresh system as defined in claim 9 including:

means for retrieving the remaining coded image information for storage in said refresh memory store; and means for activating said means for generating a partition boundary to identify the retrieved remaining coded image information as part of an overflow image for display on the raster display.

12. In a raster display device, the combination comprising:

a processor including a memory store for storing visual image data;

compression means for compressing the visual image data retrieved from said processor memory store under control of the raster display device, into a plurality of individual compressed non-overlapping image segments;

a refresh image store for storing said image segments at addressible storage locations;

means for generating control information representative of the storage address for each of said compressed image segments of said image stored in said refresh storage means;

an increment directory storage means for storing said control information at incrementally addressible locations;

a plurality of decompressor means for decompressing said image segments into visual signals for use by the raster display;

a plurality of refresh buffer means, one associated with each decompressor means for intermediate storage of said visual signals; and cyclic image refresh control means including means for incrementally retrieving control information from said increment directory storage means, and responsive thereto for generating address locations for cyclically and sequentially gating compressed data segments of said image from said refresh storage means to one of said decompressor means and then to one of said refresh buffer means for refresh of the image produced by said raster display at a data rate to adapt the decompression data rate to the data rate requirement of said raster display.

13. In a raster display device as defined in claim 12 further including:

means for generating an overflow indicator signal indicative of an overflow image too large for a single display, said overflow indicator signal controlling said processor to limit the visual image data retrieved and directed to said compression means.

14. In a raster display device as defined in claim 13 including:

means for partitioning the visual image data from said processor in response to said overflow indicator signal; and means for generating a partition boundary representation in said increment directory storage means to define the partitioned visual image data for display on the raster display.

15. In a raster display device as defined in claim 14 including:

means for retrieving the remaining visual image data from said processor memory store for compression by said compression means and storage by said refresh image store; and means for activating said means for generating a partition boundary to identify the retrieved remaining visual image data as part of an overflow image for display on the raster display.

16. A raster display device designed to present image data comprising:

conversion means for compressing binary coded data representative of a visual image to be displayed;

refresh storage means for storing said compressed binary coded data;

image processing control means for dividing said image data into a plurality of non-overlapping image segments; said image processing control means comprising gating means for sequentially activating said conversion means to compress individual segments of said image data and to place the data representing the compressed segment in said refresh storage means;

increment directory storage means for storing control information representative of the storage address for each of said independent segments of said image in said refresh storage means;

a plurality of decompressor means for decompressing said compressed binary coded data;

a plurality of refresh buffer means; and image refresh control means for sequentially gating, under control of said increment directory storage means, compressed segments of said image from said refresh storage means to one of said decompressor means and to one of said refresh buffer means for refresh of the image produced by said display device.

17. A raster display device refresh system comprising:

a refresh memory store having coded image information segments representing a visual image and stored in addressible locations;

converter means for converting said coded image information into non-overlapping non-coded raster information for visual display on a raster display;

means for generating control information representative of the storage addresses and content information for each of said coded image information segments;

an increment directory storage means for storing said control information at incrementally addressible locations;

cyclic image refresh control means for incrementally retrieving control information from said increment directory store and responsive thereto for generating address locations for cyclically and sequentially retrieving said coded image information from said refresh memory store for conversion by said converter means and display on said raster display;

means responsive to said increment directory storage means for generating an overflow indicator signal indicative of an overflow image too large for a single display, said overflow indicator signal controlling said refresh memory store to limit the coded image information segments stored therein;

means for partitioning the coded image information segments in response to said overflow indicator signal; and means for generating a partition boundary representation in said increment directory storage means to define the partitioned visual image data for display on the raster display.

18. A raster display device refresh system as defined in claim 17 wherein said converter means includes:

a plurality of decompressor means for decompressing said coded image information segments into non-coded raster information; and a plurality of refresh buffer means, one associated with each decompressor means for intermediate storage of said non-coded raster information for use by the raster display.

19. A raster display device refresh system as defined in claim 17 including:

means for retrieving the remaining coded image information for storage in said refresh memory store; and means for activating said means for generating a partition boundary to identify the retrieved remaining coded image information as part of an overflow image for display on the raster display.

* * * * *